United States Patent [19]

Winters et al.

[11] Patent Number: 4,659,380

[45] Date of Patent: Apr. 21, 1987

[54] WATER-BORNE PERMANENT COATING COMPOSITIONS AND PROCESSES THEREFOR

[75] Inventors: Jonathan K. Winters, Portsmouth, Ohio; Fredrick B. Savell, III, Mobile, Ala.

[73] Assignee: Ashland Oil, Inc., Ashland, Ky.

[21] Appl. No.: 774,638

[22] Filed: Sep. 11, 1985

Related U.S. Application Data

[63] Continuation of Ser. No. 382,853, May 24, 1982, abandoned.

[51] Int. Cl.[4] .......................... C04B 9/02; B05D 1/08
[52] U.S. Cl. ................... 106/14.14; 106/243
[58] Field of Search ............. 106/264, 267, 243, 14.14

[56] References Cited

U.S. PATENT DOCUMENTS

| | | | |
|---|---|---|---|
| 2,662,865 | 12/1953 | Beauchamp | 260/29.3 |
| 2,921,858 | 1/1960 | Hall | 106/14.14 |
| 3,087,835 | 4/1963 | Auer | 117/73 |
| 3,132,055 | 5/1964 | Tanaka | 148/6.16 |
| 3,175,964 | 3/1965 | Watanabe | 204/37 |
| 3,248,350 | 3/1966 | Triggle | 260/17 |
| 3,269,967 | 8/1966 | Broadhead | 106/243 |
| 3,346,522 | 10/1967 | Schuster et al. | 260/17.4 |
| 3,434,987 | 3/1969 | Dhein et al. | 260/21 |
| 3,446,764 | 5/1969 | Phillips et al. | 260/22 |
| 3,474,060 | 10/1969 | Dhein et al. | 260/21 |
| 3,639,315 | 2/1972 | Rodriguez | 260/22 TN |
| 3,699,065 | 10/1972 | Clark | 260/222 |
| 3,699,066 | 10/1972 | Hunsucker | 524/901 |
| 3,752,778 | 8/1973 | Dhein | 260/22 TN |
| 3,896,072 | 7/1975 | Tummier et al. | 260/29 |
| 4,029,831 | 6/1977 | Daunheimer | 427/264 |
| 4,071,514 | 1/1978 | Ribbecke | 260/22 M |
| 4,225,477 | 9/1980 | Vasishth | 427/429 |
| 4,293,471 | 10/1981 | Heiberger | 106/264 |
| 4,444,802 | 4/1984 | Winters et al. | 427/27 |
| 4,444,803 | 4/1984 | Winters et al. | 427/27 |

FOREIGN PATENT DOCUMENTS

| | | | |
|---|---|---|---|
| 0014628 | 2/1977 | Japan | 106/264 |
| 997626 | 7/1965 | United Kingdom | 106/264 |

OTHER PUBLICATIONS

"Chemistry of Organic Compounds", Noller, Carl R., 1965, pp. 680 & 681.

Spencer Kellogg Textron, TD-7911, technical service data sheet.

*Primary Examiner*—Theodore Morris
*Attorney, Agent, or Firm*—Richard C. Willson, Jr.; Louis Gubinsky

[57] ABSTRACT

Water reducible, dispersible, corrosion resistant coating compositions and methods for their manufacture are disclosed and demonstrated to be useful for protecting metals from corrosion. The composition comprises a water reducible, dispersible alkyd resin; a coupling agent; a surfactant; an amine; one or more driers; a chelating agent; water; and in one embodiment, a metallic inhibitor.

6 Claims, No Drawings

WATER-BORNE PERMANENT COATING COMPOSITIONS AND PROCESSES THEREFOR

This application is a continuation of application Ser. No. 382,853, filed May 24, 1982, now abandoned.

CROSS REFERENCES TO RELATED APPLICATIONS

The present application discloses compositions and techniques related to those of U.S. Pat. No. 4,479,981 filed May 3, 1982, U.S. Pat. No. 4,444,803 filed May 3, 1982, and also to U.S. Pat. No. 4,444,802 filed May 3, 1982.

BACKGROUND OF THE INVENTION (1) Field of the Invention

The present invention relates particularly to organic coating compositions and methods for their use generally classified in Class 106, particularly in Subclasses 270, 271 and 272, Class 252, particularly in subclasses 51.5R, 70, 77, 392, 403 and Class 260, particularly subclass 45.8N, 308B, and 814.

(2) Description of the Prior Art

U.S. Pat. No. 3,434,987 and U.S. Pat. No. 3,474,060, to Dhein et al, teach the use of modified alkyd resins with melamine/formaldehyde and stoving at 150° C.

U.S. Pat. No. 3,346,522, to Schustes, et al, teach that acrylic resins and sucrose form milky dispersions of good storage stability, which, with Chromate, make good varnishes.

U.S. Pat. No. 3,896,072, Turmuler et al, teach the use of various monomers which result in coatings of high performance; e.g., automobile use, etc. when stoved at 160° C.

U.S. Pat. No. 2,662,865, Beauchamp, teach the use of amides and a phenol-formaldehyde resin in a two component system to produce laquers and varnishes.

Protection of metal surfaces by the use of varnish-type coatings has advantages, such as visibility of characters and illustrations below the coating surface, as well as decorative features. Historically, metal varnishes have required organic base solvents, with the attendant workers' exposure and environmental disadvantages. In addition, prior organically-based systems have been incapable of solubilizing many additives, such as chromates, nitrites, borates, molybdates, and triazoles.

The reported water-borne systems, on the other hand, have had other deficiencies. Rust and corrosion protection have been so poor that water borne types have been essentially restricted to cosmetic functions.

In contrast, the present invention, possibly through the use of co-solvents which tend to form azeotropes that enhance early water resistance during curing, provides coatings having substantial life even in corrosive environments. While not wishing to be bound to any theory or mechanism, it appears that the co-solvents tend to act as dispersing agents and additionally enhance stability of the liquid compositions at low temperatures.

In brief review, other prior U.S. patents of interest include:

U.S. Pat. No. 3,660,128 to Scheldahl, relating to inverted wax emulsion pastes for artwork;

U.S. Pat. Nos. 2,862,825 to Westlund et al, 2,943,945 to Saywell, and 3,565,843 to Kassinger, all relating to soluble oils, not to firm wax coatings;

U.S. Pat. No. 3,434,851 to Miller, relating to solvent-borne asphalt coatings;

U.S. Pat. Nos. 3,446,764 to Phillips, 3,699,065 to Clark, 4,184,991 to Scheurman III, 3,223,666 to Botton, 3,379,548 to Jen, 4,039,495 to Hunsucker, 4,051,089 to Tobias, and 4,081,411 to Hunsucker, all relating to base resin formulas, not to completed coatings;

U.S. Pat. No. 3,494,882 to Andrews, relating to high gloss emulsified polyester emulsions;

U.S. Pat. No. 4,187,204 to Howard, relating to water-borne paint containing, not over 10% water;

U.S. Pat. No. 4,225,477 to Vosishth and Wang, relating to co-solvent changes in water-borne coatings to control re-coatability (the coating's ability to form a substrate for a topcoat);

U.S. Pat. No. 4,148,948 to Williams, relating to a leveling additive for water dispersible paints; and, U.S. Pat. No. 3,413,227 to Howard and Randell, relating to substituted benzotriazole.

Other patents considered in preparing this application are:

U.S. Pat. No. 3,081,238—Gurry, R. W.
U.S. Pat. No. 2,900,262—Green, H. A.
U.S. Pat. No. 2,669,862—Beauchamp, D. N.
U.S. Pat. No. 3,804,920—Cunningham, A. L., et al.
U.S. Pat. No. 3,814,709—Meissner, H. J., et al.
U.S. Pat. No. 4,137,132—Ward, J. J. B.
U.S. Pat. No. 3,720,616—Randell, D. R.
U.S. Pat. No. 3,210,351—D'Alello, G. F.
U.S. Pat. No. 3,597,353—Randell, D. R., et al.
U.S. Pat. No. 3,972,845—Nikaido, et al.
U.S. Pat. No. 3,282,744—Goldsmith, F. C.
U.S. Pat. No. 4,169,741—Lampatzer, K., et al.
U.S. Pat. No. 3,346,522—Shuster, L. K.
U.S. Pat. No. 3,615,740—Goltz, K.
U.S. Pat. No. 3,840,483—Guldenpfennig, R.
U.S. Pat. No. 3,932,285—Ceprini, M. Q.
U.S. Pat. No. 3,484,343—Kitamura, Y., et al.
U.S. Pat. No. 3,953,344—Naruschima, U.
U.S. Pat. No. 3,993,510—Bellaviu, P. N.
U.S. Pat. No. 3,879,335—Storck, et al.
U.S. Pat. No. 2,695,910—Asseff, P. A., et al.
U.S. Pat. No. 3,565,678—Johnson, et al.
U.S. Pat. No. 4,239,648—Marshall, et al.
U.S. Pat. No. 4,059,452—Nishijima, et al.
U.S. Pat. No. 3,653,931—Burchart, et al.

None of the above-cited patents teach combining the components of the present invention, and particularly not the addition of inhibitors, to form a water-borne permanent non-corrosive film, capable of formulation into light colors.

SUMMARY (1) General Statement of the Invention:

The present invention relates to water-borne coating compositions of high temperature (e.g. 52° C.) storage stability which, when applied to a substrate, form a hard, flexible, permanent, low odor, corrosion preventative film capable of being formulated in light colors.

More particularly, the coating compositions of the present invention are capable of application and flow onto a solid substrate, and comprise: (1) one or more water reducible resins, (2) one or more metallic driers, (3) one or more surfactants, (4) one or more coupling agents, many of which are carefully selected to result in a final dispersion stable at higher temperatures, (5) one or more inorganic rust inhibitors and (6) water; to form a water-borne dispersion for greatly improved corrosion resistance, especially when employed as a long-term metal preservative.

(2) Utility of the Invention:

The invention provides valuable coating formulations having excellent corrosion protection, air cure properties and storage stability.

DESCRIPTION OF THE PREFERRED EMBODIMENTS STARTING MATERIALS

Resins

Preferably the compositions of the present invention will include alkyd resins derived from isophthalic acid, terephthalic acid, or phthalic anhydride modified so as to contain ester groups, which promote water dispersibility. These resins can be short oil, medium oil, long oil.

The average molecular weight of the resin constituent will preferably be in the range of from about 150 to 450, more preferably 250 to 425 and most preferably 300 to 400.

Also, the degree of branching in the resin molecules should be selected so that after esterification the average molecular chain will contain a sufficient quantity of hydrophilic ends to achieve easy water dispersibility. Based on the information given below, this quantity will be obvious to those skilled in the art.

The average acid value of the resins useful in the present invention will preferably be in the range of from 15 to 100, preferably 20 to 80 and most preferably 30 to 55.

When used in the invention, the amount of resin used will be in the range of 27 to 40, more preferably 28 to 33 and most preferably 29 to 33 weight percent, based on the weight of the composition.

Commercially available resins useful in the present invention are the Kelsol resins from Spencer-Kellogg of Buffalo, N.Y., and particularly Kelsol 3907 derived from isophthalic acid, water dispersable air dry resins from Cargill Co. of Minneapolis, Minn. and resins from McCloskey Paint and Varnish Co. of Philadelphia, Pa.

Surfactants

Surfactants useful with the present invention are the alcohol derived surfactants such as Surfynol 104A (2-ethylhexanol) from Air Products of Allentown, Pa. and Raybo 62 from Raybo Chemical Co. of Huntington, W.Va.

These surfactants will act as leveling agents and in some cases, as antifoams. When used in the present invention, the amount of the surfactant used will be in the range of from 0.05 to about 3, more preferably 0.1 to 2.5 and most preferably 0.2 to 1.0 weight percent, based on the weight of the composition. However, this will vary in response to the selection and quantities of the other ingredients employed.

Coupling Agents

The use of coupling agents is a special feature of the present invention.

Several types of coupling agents can be employed with the invention including ethylene glycol ethers, preferably butyl and propyl ethers; hydroxy ethers (ether-alcohols), such as butyl cellosolve, diethylene glycol monoethyl ether, monopropyl ether, propyl cellolsolve, ethyl cellosolve, and other coupling agents which will be evident to those skilled in the art for use in specialized formulations according to the present invention. The alkyd resin and the surfactant can preferably be Kelsol 3907.

The coupling agent is selected by physical test; anything which does not interfere with the compositions of the present invention and which renders their ingredients mutually soluble in the water base will generally be acceptable.

For example, alcohols such as ethanol, isopropanol and isobutanol will generally be useful as coupling agents for the present invention. Commercial coupling agents that are useful with compositions of the present invention include: Ektasolve EP (propyl cellosolve), manufactured by Eastman Kodak of New York, N.Y. and Propasol P, manufactured by Union Carbide of Danbury, Conn.

The coupling agents of the present invention will generally be employed in quantities of from about 1% to about 15% or more, more preferably from about 3% to about 12%, and most preferably from about 4% to about 10% based on the weight of the formulation.

In addition to its coupling functions, the coupling agent will usually be useful during the drying and curing process, after application of the coatings composition to substrates. For example, when carefully selected, the coupling agent will form an azeotrope with the water present in the composition, thus increasing volatility, speeding cure, and providing a more permanent coating. Some coupling agents will assist the final coating in other ways, e.g., by providing leveling of the final coating, avoiding pinholes and providing a more continuous, better quality dry film.

Water

Deionized water will preferably be employed with the compositions of the present invention, in order to prevent chlorine, calcium, magnesium or other components of tap water from interfering with the compositions or their curing abilities. Distilled water could, of course, be employed but will generally be avoided for economic reasons.

Compositions of the present invention will generally contain a minimum of about 45%, more preferably 50% and most preferably 60% or even more of water, based on the total weight of the formulation.

As the compositions of the present invention are generally classifiable as oil-in-water emulsions of special character, a quantity of water greater than about 92% may cause swelling and loss of wetting properties in most of the compositions of the present invention, although specialized compositions utilizing carefully selected non-aqueous ingredients may tolerate water up to about 97% by weight based on the weight of the total formulation.

pH

The pH of this system will be preferably in the range of 7.0–10 preferably 8.0–9.0 and most preferably 8.2–8.5. One should slightly overbase (make alkaline) the system to obtain maximum surfactant activity of the resin ester groups by reacting any residual acids which may be left from the normal end point of titration with an alkaline material, (e.g. amines, triethanolamine morpholine, or ammonium hydroxide) to form a soap. Excessive amounts of base should be avoided because they will form an extremely "hard" salt which is not miscible in water, thus causing the aqueous and non aqueous phases to separate.

Driers

The compositions of the present invention will include metallic driers which are oxidizing in nature and react with the free ester sites of the dry resin film to form a harder, more impermeable protective film.

Preferable driers useful in the present invention include cobalt driers, especially 6% cobalt drier such as cobalt hydrocure II from Mooney Chemical Co. of Cleveland, Ohio, and 12% cobalt drier from Ferro Corp. of Bedford, Pa. Manganese driers will also be useful in the present invention and are available from the companies listed above. Although any concentration of cobalt and manganese will be useful, it is preferable to use both a 6% cobalt drier and a 6% manganese drier in the compositions of the present invention.

Ranges for use of the driers in the composition of the present invention will be based upon the metal content of the driers and the metal content will be in the range of from about 0.1 to about 5 weight percent.

Chelating Agents

Also, when desirable, one may require faster oxidation of driers. This may be accomplished by use of various chelating agents.

One chelating agent particularly useful with the present invention is 1,10-phenanthroline which is sold under the tradename Activ-8 and is manufactured by R. T. Vanderbilt Co. of Norwalk, Conn.

The quantity of chelating agent to be employed can be calculated as about one-tenth of the weight of total metal present from the driers.

Inhibitors

It may be desirable to give added protection to compositions of the present invention by the use of iorganic water soluble inhibitors, which is another embodiment of the present invention. Selections will be made by those skilled in the art based upon the desired finished composition and its intended application.

Inhibitors particularly useful in long term protection of ferrous alloys are the ammonium salts of dichromate and molybdate. These salts, where added in sufficient quantities not only add corrosion resistance to the finished dry film but also increase viscosity and impart thixotropy to the compositions while in solution. This provides an application aid in that very low solids content versions of this embodiment of the present invention will provide very high film building characteristics.

These inhibitors are commercially produced by Allied Chemical Company, a subsidiary of Allied Company located in Morristown, N.J.

Another inhibitor found to be particularly useful in the present invention, where the protection of nonferrous alloys, such as aluminum, is a consideration is the sodium salt of tolytriazole. This product is commercially available from Sherwin-Williams Company of Chicago, Ill.

These inhibitors will act as metal passivators. The amount of the inhibitors used will depend upon the severity of the application but have been found useful in the present invention at levels in the range from 0.01% to about 1%, more preferably 0.05% to 0.7% and most preferably 0.1% to 0.6%, based on the total weight of the formulation. However, this will vary in response to the selection and quantities of the other ingredients employed.

Amines

Amines useful in the present invention are morpholine, 26-28% ammonium hydroxide (referred to herein as concentrated ammonium hydroxide), triethanolamine diethanolamine, ethanolamine and mixtures thereof.

When used in the present invention, the amount of amine used will be in the range of from about 0.1 to about 3.5 weight percent, preferably 0.5 to 3.0, most preferably 0.5 to about 2.5 weight percent.

Techniques in Mixing

Apparatus:

The apparatus for the present invention will be those conventionally utilized in the preparation of coating compositions; e.g., kettles and mixing tanks having flow metering or measuring devices and agitation means; e.g., pumps mounted on side-arms connecting the main vessel, internal stirrers, contra-rotating shearing devices and any of the other available devices which are well known to the art.

Temperature:

In general, the water will be at about 70° F. (21° C.), and the non-aqueous ingredients will be transferred and mixed at that temperature. However, these temperatures are not narrowly critical and will vary to provide faster mixing or better compatability of ingredients according to the observation of those skilled in the art.

Mixing Procedure:

While the formulations of the present invention may be manufactured continuously if desired, batch techniques will be more usually employed. For example, the total amount of water desired in the finished composition (e.g., 1700 gallons, 6,562 liters) is charged to a mixing vessel large enough to hold the entire batch of the commposition. Added to this are one half the amount of coupling agent used, the amine and, when desired, the inhibitor, with agitation. The water dispersible resin is then added to the mixing vessel and this mixture can be agitated while the drier is prepared in a separate vessel.

In a separate vessel the driers and the remaining coupling agent are mixed thoroughly, and that mixture is then added to the mixing vessel. The composition is then mixed until homogeneous, after which the composition is drawn off into shipping containers; e.g., tank cars, tank trucks, drums or smaller cans.

Quality Control

The finished composition, prior to packaging, will generally be checked for pH, solids content, freeze-thaw stability, corrosion-protection under accelerated conditions and other tests utilizing techniques well known to the coatings industry.

Application

The formulations of the present invention may be applied to substrates to be protected by conventional application techniques, such as spraying, brushing, roller-coating, dipping, flow-coating, or electrostatic airless spraying. Coating thickness can be varied by changing the formulation, the number of coats, or the amount applied per coat, but in general will be in the range from about 0.5 to about 3 mils per coat, after drying.

EXAMPLES

It will be understood by those skilled in the art that the invention is not to be restricted by the following examples, which merely illustrate the invention and that the invention is susceptible to a wide variety of modifications and variations without departing from the spirit thereof. For example, the compositions of the invention can be prepared as concentrates to which a substantial amount of water can be added later in order to avoid shipping water, particularly for international or other long distance shipments.

The compositions may also contain other useful ingredients such as biocides, antifoam agents, pigments, dyes or leveling agents, well known to those skilled in coatings technology.

EXAMPLE I

The components for preparing this composition are as follows:
29.0 wt % Kelsol 3907;
57.8 wt % water;
10.0 wt % butyl cellsolve;
2.5 wt % concentrated ammonium hydroxide;
0.2 wt % cobalt drier (6% cobalt drier);
0.1 wt % manganese drier (6% manganese drier); and
0.04 wt % Activ-8.

The water is charged to a conventional mixing kettle, equipped with a rotary agitator, at a temperature of 21° C. (70° F.). Five weight percent of butyl cellosolve and the ammonium hydroxide are then charged to the kettle. After agitation, the Kelsol 3907 is added. This solution is allowed to be agitated as the drier solution is prepared in a separate vessel.

To a second smaller vessel, the remaining butyl cellosolve is added, mixed with the Activ-8 and this solution is agitated well. The cobalt drier and the manganese drier are then added to the second container. After further agitation, this mixture is transferred to the main mixing kettle, which is further agitated until the composition is homogeneous.

If needed, the pH is then adjusted to 8.5 by addition of less than one part concentrated ammonium hydroxide. The solids content is then found to be 22%±1%.

The composition is then tested for corrosion resistance by applying it to a cold rolled 1010 steel panel. After drying for seventy-two hours, the test panel is subjected to a 5% salt (NaCl) spray at a temperature of 35° C. (95° F.) according to ASTM Test B-117. The test panel resists failure (corrosion) for 100 hours.

A similar test panel coated with the composition of this example resists 500 hours of exposure to 100% relative humidity at 49° C. (120° F.) according to the techniques of ASTM Test D-2247.

A sample of the composition of this example survives five successive freeze-thaw cycles, each comprising 16 hours at −18° C. (0° F.), followed by eight hours at 25° C. (77° F.) with no separation or other evident deleterious effects. A sample of the composition of this example withstands 144 hours at 49° C. (120° F.) without separation or other observable deleterious effects.

When a panel as previously described is dipped into the composition of this example and allowed to dry at room temperature and approximately 50% relative humidity, the coating is cured and dry to the touch in 30 minutes.

The thickness of the composition of the above test panels is approximately 0.7 mil (approximately 18 microns or 0.18 millimeters).

EXAMPE II

The components of this composition are as follows:
30.3 wt % Kelsol 3907;
50.0 wt % water;
17.0 wt % butyl cellosolve;
2.3 wt % concentrated ammonium hydroxide;
0.2 wt % cobalt drier (6% cobalt drier); and
0.2 wt % Activ-8.

The water is charged to a mixing vessel, equipped with a rotary agitator, at a temperature of 21° C. (70° F.). 8.5 wt % of butyl cellosolve and the ammonium hydroxide are then charged to the vessel. After agitation, the Kelsol 3907 is added. This solution can be allowed to stir while the drier solution is prepared in a separate vessel.

To a second smaller vessel, the remaining butyl cellosolve is added and mixed with the Activ-8, and this solution is agitated well. The cobalt drier is then added to the second vessel. After further agitation, this mixture is transferred to the main mixing vessel and the entire composition is further agitated until it is homogeneous.

Solids content is then found to be 23%±1%. The pH is then checked to insure that it is between 7.0–10, and preferably 8.2–8.5.

The composition is then tested for corrosion resistance by applying it to a cold rolled 1010 steel panel. After drying for 72 hours, the panel is subjected to a 5% salt (NaCl) spray at a temperature of 35° C. (95° F.) according to ASTM Test B-117. The panel resists failure for 100 hours.

A similar panel is coated with the composition of this example and is found to resist 500 hours of exposure to 100% relative humidity at 49° C. (120° F.) according to the techniques of ASTM Test D-2247.

The composition survives 5 successive freeze-thaw cycles, each comprising 16 hours at −18° C. (0° F.) followed by 8 hours at 25° C. (77° F.) with no separation or other evident deleterious effect. A sample of the composition of this example withstands 144 hours at 49° C. (120° F.) without separation or other observable or deleterious effect.

When a panel as previously described is dipped into the composition of this example and allowed to dry at room temperature and approximately 50% relative humidity, the coating is cured and dry to the touch in 35 minutes.

The thickness of the composition on the above test panels is approximately 0.7 mil (approximately 18 microns or 0.18 millimeters).

EXAMPLE III

The components for this composition are:
29.3 wt % Kelsol 3907;
58.98 wt % water;
10.0 wt % butyl cellosolve;
1.5 wt % concentrated ammonium hydroxide;
0.02 wt % cobalt drier (6% cobalt drier); and
0.2 wt % Activ-8.

The composition is prepared as in Examples I and II and the solid content is found to be 22%±1%.

However, when this composition is tested for resistance, by applying it to a cold rolled 1010 steel panel and allowing it to dry for 72 hours, the ASTM Test B-117 shows that the test panels resist failure for only 40 hours. The relative humidity test, according to the techniques of ASTM Test D-2247 is only 72 hours.

The problems with Example III are believed to be encountered because the film cures poorly due to an insufficient amount of drier being present.

EXAMPLE IV

The components for this composition are as follows:
55.97 wt % water;
0.24 wt % ammonium dichromate;
1.78 wt % normal butyl alcohol;
32.68 wt % Kelsol 3907;
0.76 wt % cobalt Hydrocure II;
0.1 wt % Activ-8;
4.46 wt % butyl cellosolve;
2.08 wt % Ektasolve EP;
0.32 wt % Surfynol 104A; and
1.61 wt % concentrated ammonium hydroxide.

The water is charged to a conventional mixing kettle, equipped with a rotary agitator, at about 21° C. (70° F.). With agitation, the ammonium dichromate is then added, followed by the butyl alcohol, 1.04 wt % Ektasolve EP and the ammonium hydroxide. After agitation, the Kelsol 3907 is added and the solution is strongly agitated until it becomes homogeneous. This solution can be allowed to mix while the driers are formed in a second vessel.

To a second smaller vessel, the remaining 1.04 wt % Ektasolve EP and the Activ-8 are added. After strong agitation, the cobalt Hydrocure is added. After further agitation, this mixture is added to the mixing kettle and agitated until the composition is homogeneous.

The pH is then adjusted to approximately 8.2 by the addition of less than 1 part of ammonium hydroxide. The solid contents is found to be 25%±1%.

The composition is then tested for corrosion resistance by applying it to a cold rolled 1010 steel panel. After drying for 72 hours, the test panel is subjected to a 5% salt spray at a temperature of 35° C. (95° F.) according to ASTM Test B-117. The test panel resists failure for 300 hours.

A similar test panel coated with a composition of this example resists 1500 hours of exposure to 100% relative humidity at 49° C. (120° F.) according to the techniques of ASTM Test D-2247.

The composition survives 5 successive freeze-thaw cycles each comprising 16 hours at −18° C. (0° F.) followed by 8 hours at 25° C. (77° F.) with no separation or other evidence of deleterious effects. The composition withstands 144 hours at 49° C. (120° F.) without separation or other observable or deleterious effects.

When a panel as previously described is dipped into a composition of this example and allowed to dry at room temperature in approximately 50% relative humidity, the coating is cured and dry to the touch within 30 minutes.

The thickness of the composition on the above test panels is approximately 1.25 mils (approximately 37 microns or 0.37 millimeters).

EXAMPLE V

The components for this composition are as follows:
32.70 wt % Kelsol 3907;
58.975 wt % water;
2.0 wt % normal butyl alcohol;
3.0 wt % butyl cellosolve;
2.4 wt % concentrated ammonium hydroxide;
0.4 wt % cobalt (6% cobalt driver) driver;
0.025 wt % Activ-8; and
0.5 wt % ammonium dichromate.

The water is charged to a conventional kettle equipped with a rotary agitator at a temperature of about 21° C. (70° F.). With agitation, the ammonium dichromate is added. With further agitation, 1.5 wt % of butyl cellosolve and the normal butyl alcohol are added, along with the ammonium hydroxide. This solution is allowed to stir while the driers are formed in a separate container.

In a second smaller vessel, the remaining butyl cellosolve is added followed, with agitation, by the cobalt drier and Activ-8. After agitation, this mixture is added to the main mixing vessel and the entire composition is agitated until it becomes homogeneous.

The pH is then adjusted to approximately 8.0–8.5. The solids content is then found to be 27%±1%.

The composition is tested as is set forth in Example IV, according to ASTM Test B-117 and the test panel resists failure for 300 hours.

A similar test panel coated with the composition of this example resists 600 hours of exposure to 100% relative humidity at 49° C. (120° F.) according to the techniques of ASTM Test D-2247.

A sample of the composition of this example survives 5 successive freeze-thaw cycles, each comprising 16 hours at −18° C. (0° F.) followed by 8 hours at 25° C. (77° F.) with no separation or other evident deleterious effects. The sample withstands 144 hours of 49° C. (120° F.) without separation or other observable deleterious effects.

When a panel as previously described is dipped into the composition of this example and allowed to dry at room temperature and approximately 50% relative humidity, the coating is cured and dry to the touch in 30 minutes.

The thickness of the composition of this example on the above test panel is approximately 1.25 mil (approximately 37 microns or 0.37 millimeters).

However, the composition of this example is very hazy at low temperatures, and this is believed to be caused by the low amount of coupling agent used.

EXAMPLE VI

The components for this formulation are as follows:
30.0 wt % Kelsol 3907;
58.28 wt % water;
10.0 wt % butyl cellosolve;
1.0 wt % concentrated ammonium hydroxide;
0.5 wt % triethanolamine;
0.02 wt % (6% cobalt drier) cobalt drier; and
0.2 wt % Activ-8.

The composition is prepared per examples I-III. The solids content is found to be 23%±1%.

The ASTM Test B-117, conducted as set forth in Examples I-III, shows that the test panel resists failure for 24 hours. The ASTM Test D-2247, conducted per Examples I-V, shows that the composition of this example resists 72 hours of exposure. The thickness of the composition on the test panels was 0.5 mil (approximately 13 microns or 0.13 millimeters).

The film of the composition of this example cures poorly and this is thought to be due to the composition not having enough drier present.

What is claimed is:
1. A water reducible, dispersible coating composition, comprising:

A. about 27 to 40 wt% of a water reducible, dispersible alkyd resin derived from isophthalic acid;
B. about 1 to 15 wt% of a coupling agent;
C. about 0.1 to 3.5% wt% of concentrated ammonium hydroxide;
D. 1 or more metal containing driers, said metal constituents being in the range of about 0.1 to 5 wt%;
E. about 0.025 to 0.2 wt% of a chelating agent;
F. about 45 to 97 wt% of water;
G. about 0.01 to 1% water soluble metal inhibitor;

wherein the average molecular weight of the resin is in the range of 150 to about 450 and the acid value in the range of 15 to about 100; said coupling agent is selected from the group consisting of ethers, ethanol, isopropanol, isobutanol and mixtures thereof; said driers are selected from the group consisting of a cobalt drier, a manganese drier and mixtures thereof; said chelating agent is 1,10-phenanthroline; and wherein the pH of said composition is adjusted to the range of about 7 to 10.

2. A water reducible, disposable coating composition according to claim 1 comprising:
A. about 28 to 33 wt% of water reducible, dispersible alkyd resin;
B. about 3 to 12 wt% of coupling agent;
C. about 0.5 to 3.0 wt% of concentrated ammonium hydroxide;
D. 1 or more metal containing driers, said metal constituent(s) being in the range of about 0.1 to about 5 wt%;
E. chelating agent the amount of which is about 0.1 of the weight of the total metal present in said drier(s); and
F. about 50 to 97 wt% of water;

wherein the composition has a molecular weight in the range of 250 to 425, an acid value of 20 to 80 and a pH of 8 to 9.

3. A water reducible, disposable coating resin, comprising:

A. about 27 to 33 wt% of water reducible, dispersible alkyd resin;
B. about 4 to 10 wt% of coupling agent;
C. about 0.5 to 2.5 wt% of concentrated ammonium hydroxide;
D. 1 or more metal containing driers, said metal constituent(s) being in the range of about 0.1 to about 5 wt%;
E. about 0.025 to 0.2 wt% chelating agent the amount of which is about 0.1 of the;
F. about 60 to 97% of water;
H. about 0.01 to 1% water-soluble metal inhibitor;

wherein the composition has a molecular weight in the range of 150 to 450, an acid value of 15 to 100 and the composition a pH of 7 to 10.

4. A composition according to claim 1, comprising:
A. 29.0 wt% of an alkyd resin derived from isophthalic acid;
B. 10.0 wt% butyl cellosolve;
C. 2.5 wt% concentrated ammonium hydroxide;
D. 0.2 wt% cobalt drier (6% cobalt drier);
E. 0.1 wt% manganese drier (6% manganese drier); and
F. 0.04 wt% 1,10-phenanthroline;
G. 57.8 wt% water;

said composition having a pH of about 8.5.

5. A composition according to claim 1 comprising:
A. 32.70 wt% of an alkyl resin derived from isophthalic acid;
B. 2.0 wt% normal butyl alcohol;
C. 3.0 wt% butyl cellosolve;
D. 2.4 wt% concentrated ammonium hydroxide;
E. 0.4 wt% cobalt (6% cobalt driver) drier;
F. 0.025 wt% 1,10-phenanthroline;
G. 58.975 wt% water;
H. 0.5 wt% ammonium dichromate;

said composition having a pH in the range of 8.0–8.5.

6. A composition according to claim 1 wherein the resin comprises short oil alkyd.

* * * * *

UNITED STATES PATENT AND TRADEMARK OFFICE
CERTIFICATE OF CORRECTION

PATENT NO. : 4,659,380
DATED : April 21, 1987
INVENTOR(S) : Winters et al.

It is certified that error appears in the above-identified patent and that said Letters Patent is hereby corrected as shown below: Claim 3 should read as follows:

3. A water reducible, disposable coating resin, comprising:
   A. about 27 to 33 wt% of water reducible, dispersible alkyd resin;
   B. about 4 to 10 wt% of coupling agent;
   C. about 0.5 to 2.5 wt% of concentrated ammonium hydroxide;
   D. 1 or more metal containing driers, said metal constituent(s) being in the range of about 0.1 to about 5 wt%;
   E. about 0.025 to 0.2 wt% chelating agent the amount of which is about 0.1 of the weight of the total metal present in said drier(s);
   F. about 60 to 97% of water;
   G. about 0.01 to 1% water-soluble metal inhibitor;

wherein the composition has a molecular weight in the range of 150 to 450, an acid value of 15 to 100 and the composition a pH of 7 to 10.

Signed and Sealed this

First Day of December, 1987

Attest:

DONALD J. QUIGG

*Attesting Officer*   *Commissioner of Patents and Trademarks*